Inventor,
Warren L. Gilkison
By Minturn & Minturn
Attorneys.

Oct. 11, 1932. W. L. GILKISON 1,881,482
TRAILER BODY
Filed Jan. 28, 1931 2 Sheets-Sheet 2
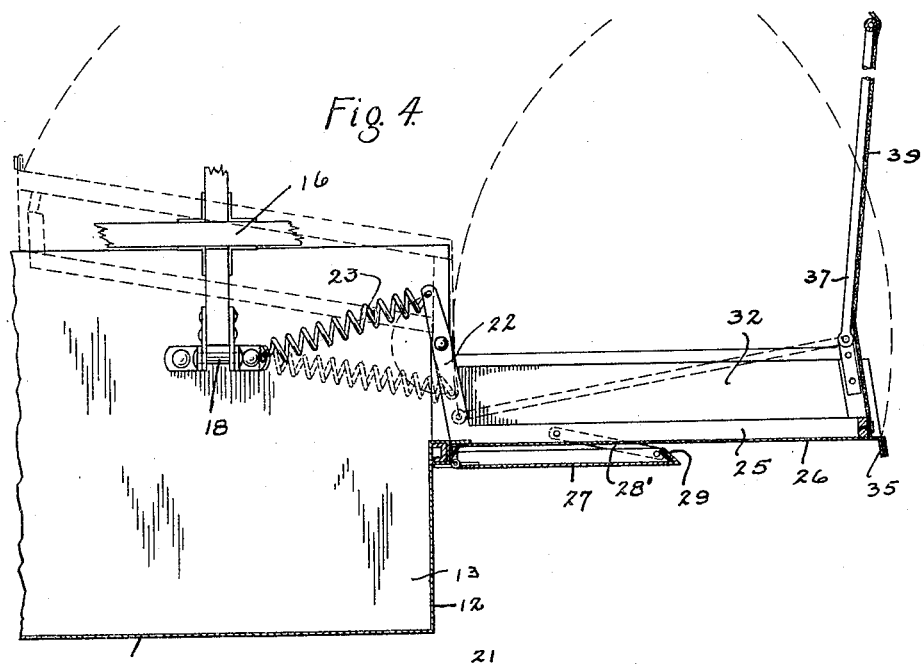
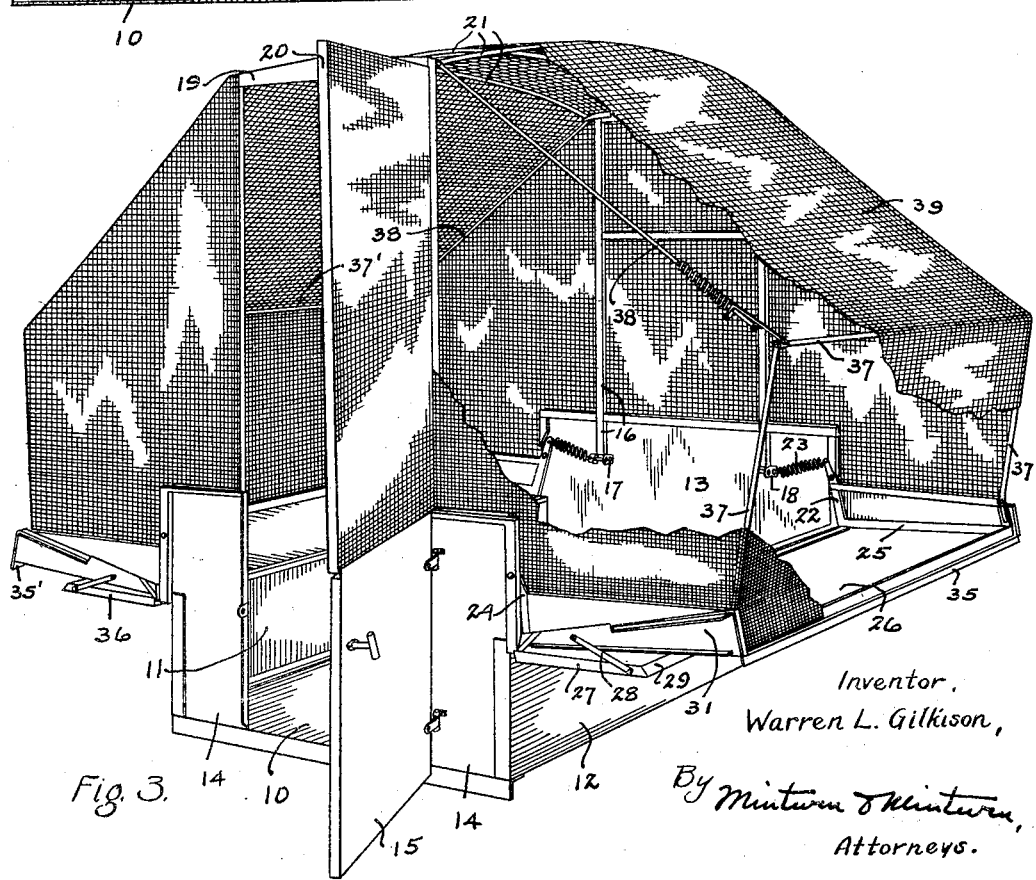
Inventor,
Warren L. Gilkison,
By Minturn & Minturn,
Attorneys.

Patented Oct. 11, 1932

1,881,482

UNITED STATES PATENT OFFICE

WARREN L. GILKISON, OF TERRE HAUTE, INDIANA, ASSIGNOR TO E. P. GILKISON & SONS COMPANY, OF TERRE HAUTE, INDIANA, A CORPORATION OF INDIANA

TRAILER BODY

Application filed January 28, 1931. Serial No. 511,840.

This invention relates to the art of camping trailers of the type adapted to be towed by automobiles, and particularly to a type of trailer that has a superstructure collapsible in nature.

A primary object of the invention is to provide a trailer body that may be opened up to bring beds into position for use with but slight physical exertion and to extend a tent covering into a taut position to afford a complete enclosure.

A primary object of the invention is to provide a body of such nature that it may have bed supporting units to close over the body and form a dust and water tight closure when the trailer is being transported on the road.

An important object is to provide a body to have bed supporting units collapsible to within the body whereby the overall height of the trailer when ready for transportation is comparatively low and in all events below that of the ordinary rear window in automobiles so that the rear vision of the driver is not obstructed.

Another important object is to provide solid closures below the beds which automatically come into position upon positioning the beds for use.

A further important object is to balance the bed supporting units so that but slight effort is required to either raise or lower the units as they may be shifted from a traveling position to position of use or the reverse.

Figure 1:
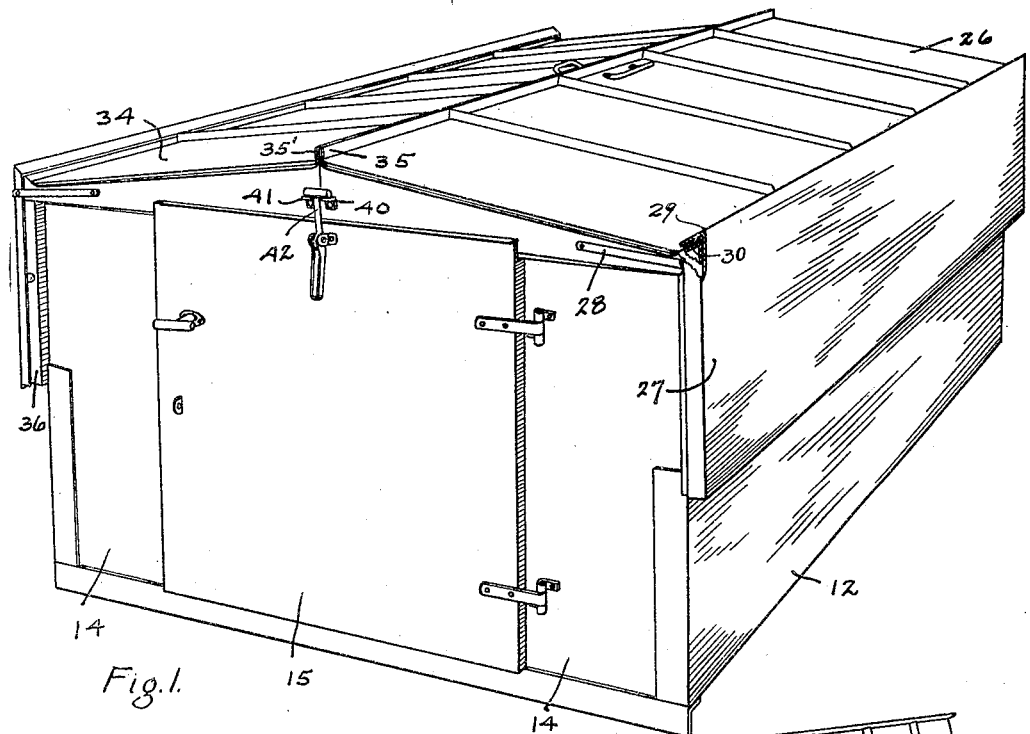
Figure 2:
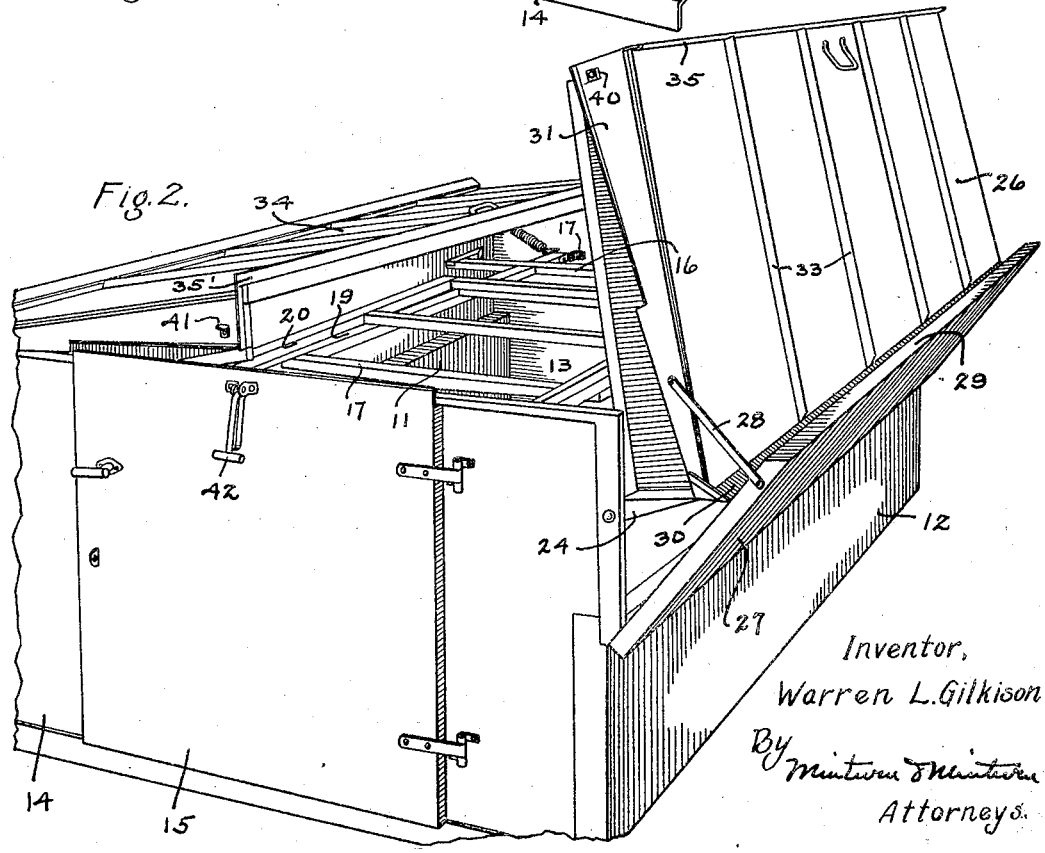

These and other objects, such as the extreme simplicity of operation, low cost of production, durability, lightness in weight, and ease of operation, all arising as the result of the unique combination of elements newly associated in the structure embodying the invention, will become apparent in the following description of one particular form of the invention as illustrated by the accompanying drawings, in which Fig. 1 is a rear view in perspective of a trailer body embodying the invention and in closed condition ready for travel;

Fig. 2, a similar view with one bed unit partly opened out and the tent covering removed for the sake of clearness;

Fig. 3, a fragmentary rear view in perspective showing the body opened out and tent covering in place; and Fig. 4, a detail in side elevation of the bed unit balancing mechanism.

Like characters of reference indicate like parts throughout the several views in the drawings.

I form a box-like bed to have the floor 10, the two sides 11 and 12, the front end 13, and the rear end 14. Both ends extend upwardly beyond the sides for a considerable distance, the ends being here shown as being substantially twice as high as the sides. In the rear end 14 is a door 15.

A frame 16 is secured by its lower end to the front end 13 on the inside by the hinges 17 and 18 below the top edge of the end on a line approximately half way between the top edge thereof and the top edges of the sides 11 and 12. Similarly, a frame 19, having a door 20 hinged thereto is hinged on the inside of the rear end 14, both of said frames being adapted to be swung from horizontally disposed positions, the frame 19 over the frame 16, Fig. 2, to vertically erect positions, Fig. 4. To retain the frames in the vertical position a plurality of arched rods 21 are removably pressed between the upper ends thereof.

Near the vertical edge of the end 13, on the inside, is pivotally secured an arm 22, Figs. 3 and 4, to have a length projecting on each side of the pivot point. The shorter end of the arm has a helical spring 23 secured thereto by one end, the other end of which is secured to the hinge 18. The pivot point of the arm 22 is substantially on the same horizontal line as that of the two hinges 17 and 18. A similar arm 24 is pivoted in the same manner to the inner side of the rear end 14, and from each of the outer or longer ends of the arms 22 and 24, angularly thereto, are fixed the arms 25 to the under sides of which is secured the sheet metal plate 26 which serves as the under side of the bed in the open position, Fig. 3 and as the lid or cover over part of the body in the closed position, Fig. 1.

An apron 27 is hinged to along the top edge of the body side 12 by its lower or inner edge and has links 28, 27' at each end pivotally secured to the ends of the apron and to the arms 25, the links being so proportioned and attached that when the plate or cover 26 is in the closed position, Fig. 1, the apron is held in the vertical position to form a complete closure between the upper edge of the side 12 and the outer edge of the plate 26 and that when the cover plate 26 is swung around to the open position, Figs. 3 and 4, the apron is swung outwardly and held at substantially a horizontal position. The apron 27 has an outer edge 29 turned inwardly and the cover plate 26 has an up-turned edge 30, each so formed, Figs. 1 and 2, that when the cover plate 26 is in the closed position, the edge 30 projects upwardly under the then down-turned edge 29 to form a seal against entrance of water. The plate 26 has ends 31 and 32 fixed thereto shaped to rest over the body front and rear ends to form complete closures therebetween and to support the plate 26 in an inclined position, Fig. 1, to have the combined overlapping edges 29 and 30 to serve as a gutter. Ribs 33 are formed on the plate 26 to reinforce it.

In the same manner as above described, a cover plate 34 is carried on the opposite side between the body ends 13 and 14 to be swung around and complete the top closure over the body, the two plates 26 and 34 meeting on a central longitudinal line and each having up-turned lips 35, 35' respectively abutting therealong with a felt strip therebetween to seal the joint and also prevent noise. Also, an apron 36 is hinged to the upper edge of the side 11 and formed and linked to the plate 34 in the same manner as that of the apron 27.

Assuming the body to be in the closed position, Fig. 1, the two cover plates 26 and 34 are lifted and swung around to the open positions where they are held by reason of their then inner edges abutting the sides 12 and 11 respectively to have the inner sides of the plates substantially flush with the top edges of the body sides. Noting particularly Fig. 4, when the plate 26 is in the closed position as indicated by the dash lines, the spring 23 is then stretched downwardly and outwardly by reason of the short end of the lever 22 being on the under side of the pivot point of the lever. Accordingly, as the plate 26 is lifted, the spring aids in swinging it to the vertical position and then, as the lever end travels on around above the pivot point, the spring being again stretched aids in retarding the drop of the plate 26. The spring 23 is so proportioned that but slight effort is required to lift the plate from either its closed or open positions.

With the plates 26 and 34 swung outwardly, the end frames 16 and 19 are raised to the vertical positions and the rods 21 positioned to hold the frames apart and elevate the tent covering 39. The U-frames 37 and 37' are then swung upwardly and outwardly from over the plates 26 and 34 to carry the tent covering outwardly and the spacing rods 38 hinged to the frames 16 and 19 are hooked into engagement with the frames 37 and 37'. The lower edge of the tent covering 39 is permanently tacked to and around the edges of the plates 26 and 34 and ends 13 and 14, and across the door 20.

The tent is collapsed and the body closed in the reverse order, and when the door 15 is closed, a T-bar 42 hinged thereto, is swung upwardly to engage over the lugs 40 and 41, Figs. 1 and 2, to hold down the cover plates. The plates 26 and 34 carry beds (not shown) on their inner sides strapped thereto as may be desired. It is thus to be seen that I have provided a very simple and easily operated trailer body which affords a large amount of space when opened for use and collapses to a compact form low in height and affords much carrying capacity for luggage and the like under the frames 16 and 19 when collapsed, access to the carrying space being had through the door 15.

While I have here shown and described my invention in the one best form as now known to me, it is obvious that structural changes may be made therefrom without departing from the spirit of the invention, and I, therefore, do not desire to be limited to that form nor any more than may be required by the following claim.

I claim:

In a trailer body, having a side and ends higher than the side, a cover plate pivotally carried between the ends adapted to be swung around to form a closure over the body or to project laterally from the side and form a horizontal sleeping bed support, and spring means aiding the swinging of the plate from either of said positions, and an apron hinged to said side and linked to said plate to serve as a closure between said side and said plate when the plate is in the closed position said plate and apron having cooperative gutter-forming and rain-excluding flanges.

In testimony whereof I affix my signature.

WARREN L. GILKISON.